US012595764B2

(12) United States Patent     (10) Patent No.:   US 12,595,764 B2

Emprin et al.     (45) Date of Patent:     Apr. 7, 2026

(54) DIHYDROGEN CONTROL ASSEMBLY FOR AN AIRCRAFT TURBINE ENGINE

(71) Applicant: Safran Aircraft Engines, Paris (FR)

(72) Inventors: Yves Emprin, Moissy-Cramayel (FR); Jérémy Edmond Fert, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/694,336

(22) PCT Filed: Sep. 15, 2022

(86) PCT No.: PCT/FR2022/051737

§ 371 (c)(1),
(2) Date: Mar. 21, 2024

(87) PCT Pub. No.: WO2023/047043

PCT Pub. Date: Mar. 30, 2023

(65) Prior Publication Data

US 2024/0401535 A1     Dec. 5, 2024

(30) Foreign Application Priority Data

Sep. 22, 2021    (FR) ................................. FR2109968

(51) Int. Cl.
| | |
|---|---|
| *F02C 7/25* | (2006.01) |
| *F02C 3/22* | (2006.01) |
| *F02C 7/266* | (2006.01) |

(52) U.S. Cl.
CPC ................ *F02C 7/266* (2013.01); *F02C 3/22* (2013.01); *F05D 2220/323* (2013.01); *F05D 2260/99* (2013.01)

(58) Field of Classification Search
None
See application file for complete search history.

(56) References Cited

U.S. PATENT DOCUMENTS

| | | | |
|---|---|---|---|
| 3,203,651 A | 8/1965 | Garrett | |
| 12,241,424 B2 * | 3/2025 | Sibbach | ................ B64D 37/32 |

FOREIGN PATENT DOCUMENTS

| | | |
|---|---|---|
| DE | 30 04 877 A1 | 8/1981 |
| FR | 3 071 550 A1 | 3/2019 |
| JP | 2016-98783 A | 5/2016 |

OTHER PUBLICATIONS

French Search Report for French Priority No. 2109968, dated Apr. 20, 2022.
International Search Report for International Application No. PCT/FR2022/051737, dated Jan. 3, 2023, with English translation.

* cited by examiner

*Primary Examiner* — Devon C Kramer
*Assistant Examiner* — Sean V Meiller
(74) *Attorney, Agent, or Firm* — BIRCH, STEWART, KOLASCH & BIRCH, LLP

(57) ABSTRACT

The present invention relates to an aircraft turbine engine (1) comprising a dihydrogen control assembly (10) having at least one dihydrogen retention zone (V) in which dihydrogen accumulates. The assembly comprises at least one spark plug (12) arranged at said retention zone (V) in order to burn at least some of the accumulated hydrogen.

10 Claims, 2 Drawing Sheets

DIHYDROGEN CONTROL ASSEMBLY FOR AN AIRCRAFT TURBINE ENGINE

FIELD OF THE INVENTION

The present invention relates to the field of turbine engines and, more particularly, to turbine engines comprising a dihydrogen circuit.

PRIOR ART

Dihydrogen is expected to become a new source of energy that is potentially able to replace certain fossil fuels.

More particularly, unlike fossil fuels the combustion of which generates carbon dioxide, the combustion of hydrogen generates only water vapour. As such, dihydrogen can be seen as an ecological alternative to fossil fuels.

However, dihydrogen has several disadvantages.

On the one hand, molecular hydrogen (i.e. dihydrogen) has a very small size (hydrogen is the lightest atom in the periodic table of the elements). Its small size makes gaseous dihydrogen particularly capable of leaking through the slightest cavity, and this whatever precautions are taken to prevent the leaks. Moreover, dihydrogen is less dense than air. Hence, in the environment of a turbine engine, dihydrogen will most certainly leak due to its low density, and will accumulate in the form of pockets of gas in certain locations of the turbine engine.

On the other hand, dihydrogen is flammable and explosive over a very large range of concentration (from 4% to 75% concentration in air). Thus, in the case of a turbine engine for which it is desired to use dihydrogen as fuel in place of kerosene, there is a very high risk of fire or deflagration within the turbine engine.

The combination of the risks of leak and fire or explosion make hydrogen particularly difficult to use in the context of a turbine engine. More specifically, the slightest leak and accumulation of dihydrogen can trigger a fire or explosion of the turbine engine. In this context, it is necessary to provide a hydrogen control assembly for a turbine engine which is safe and which can avoid the formation of stagnant pockets of dihydrogen.

DISCLOSURE OF THE INVENTION

According to a first aspect, the invention relates to an aircraft turbine engine comprising a dihydrogen control assembly having at least one dihydrogen retention zone in which dihydrogen accumulates. The assembly comprises at least one spark plug arranged at said retention zone in order to burn at least a part of the accumulated hydrogen.

Said at least one spark plug can generate microsparks, continuously or at a defined frequency.

The assembly can comprise a plurality of spark plugs, each spark plug generating microsparks at a defined frequency, the frequencies of the assembly of spark plugs being synchronised.

The frequencies of the assembly of spark plugs can be synchronised in order to always have at least one spark plug emitting a microspark.

The assembly can comprise control means of said at least one spark plug, the control means can enable a power and the frequency of said at least one spark plug to be modulated and enable, or not, said at least one spark plug to be triggered.

The assembly can comprise at least one dihydrogen detector enabling an accumulation of dihydrogen in said retention zone to be detected.

Said at least one dihydrogen detector can enable the control means to be controlled in order to trigger said at least one spark plug and to modulate the power and frequency of said at least one spark plug as a function of a detected accumulation of dihydrogen.

The control assembly can comprise a detector of the open or closed state of dihydrogen feed valves.

According to a second aspect, the invention relates to an aircraft comprising at least one turbine engine according to the invention.

DESCRIPTION OF THE FIGURES

Other features, aims and advantages of the invention will emerge from the following description, which is given purely by way of illustration and not being limiting and which should be read with reference to the attached drawings, in which.

DETAILED DESCRIPTION OF THE INVENTION

Context of a Turbine Engine

According to a first aspect, the invention proposes an aircraft turbine engine 1 comprising a dihydrogen control assembly 10.

The turbine engine 1 can be, for example, an aircraft turbofan engine which is well known to a person skilled in the art, conventionally comprising a fan, a compressor, a combustion chamber, a high-pressure turbine and a low-pressure turbine. In the case of turbofan engines, the fan has large dimensions compared with other components, and the flow of air passing through, in particular, the combustion chamber and the high-pressure and low-pressure turbines, is a small portion of the total airflow passing through the fan. A part of the airflow passing through the fan is therefore directly expelled, whereas another part passes through the compressor, the combustion chamber and the high-pressure and low-pressure turbines.

Figure 1:
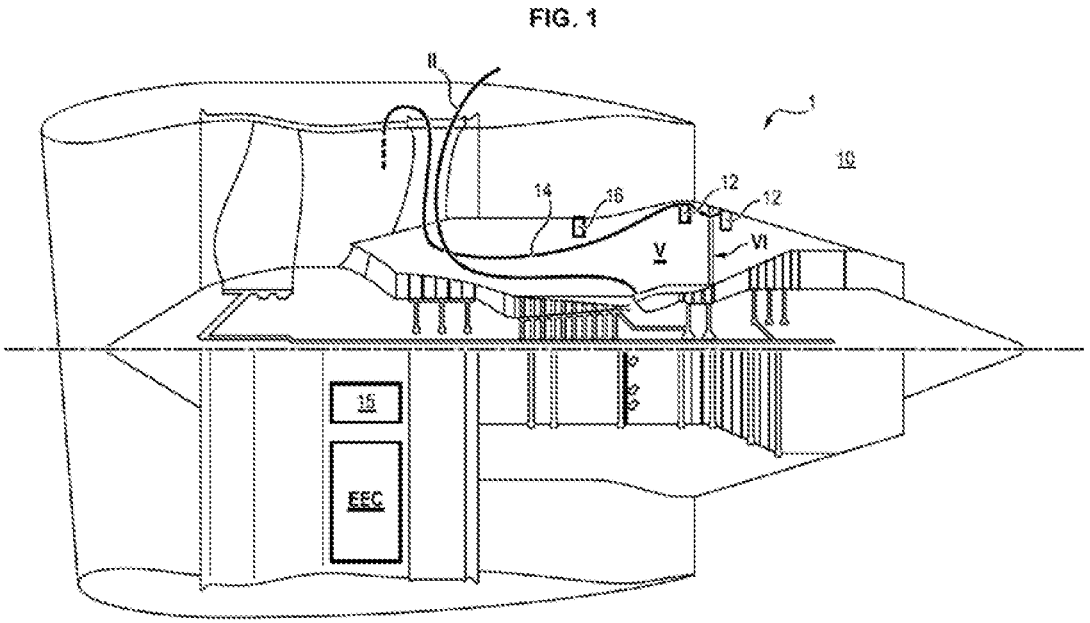
FIG. 1 is a schematic representation of the circulation of dihydrogen in an aircraft turbine engine.

Below, the invention is placed in the context of a turbine engine 1, in which the fuel is dihydrogen. Typically, dihydrogen can be provided by a network of pipes/feed circuits into the turbine engine 1 along the path II shown schematically in FIG. 1.

As mentioned in the introduction of the present patent application, it is probable that the dihydrogen will leak and will accumulate in the form of a gas pocket in the retention zones of the turbine engine 1. Typically these retention zones can be concave regions of the turbine engine 1 towards which the dihydrogen will converge and accumulate, and these can be predicted knowing the arrangement of the dihydrogen circuit and the internal architecture of the turbine engine 1. Certain zones, such as the retention zone V represented in FIG. 1, can be particularly critical due to the risk of explosion linked to the concentration of a pocket of dihydrogen in this retention zone V.

It is specified that, by way of example, the description which follows is produced by locating the assembly 10 in the retention zone V. Nevertheless, it is understood that the assembly 10 can be positioned in other zones of the turbine engine according to identified needs, dihydrogen leaks and risks.

Hydrogen Control Assembly

The dihydrogen control assembly 10 mainly comprises one (or more) spark plugs 12 arranged at the retention zone V in order to burn at least a part of the accumulated dihydrogen. The spark plugs 12 are connected by a harness 14 ensuring the electrical supply of the spark plugs 12. The control assembly 10 very cleverly enables the presence of dihydrogen in the turbine engine 1 to be made safe. More specifically, as previously indicated, it is almost certain that dihydrogen will leak in the turbine engine 1. Rather than try to prevent a leak which seems inevitable, the control assembly 10 makes it possible to adapt to the presence of leaks by gradually burning the dihydrogen which accumulates in the retention zones (such as zone V). Thus, the control assembly 10 makes it possible to avoid the formation of a pocket of dihydrogen which could constitute an explosion risk (it is estimated that a pocket becomes dangerous once the concentration of dihydrogen is greater than or equal to 2%).

Figure 2:
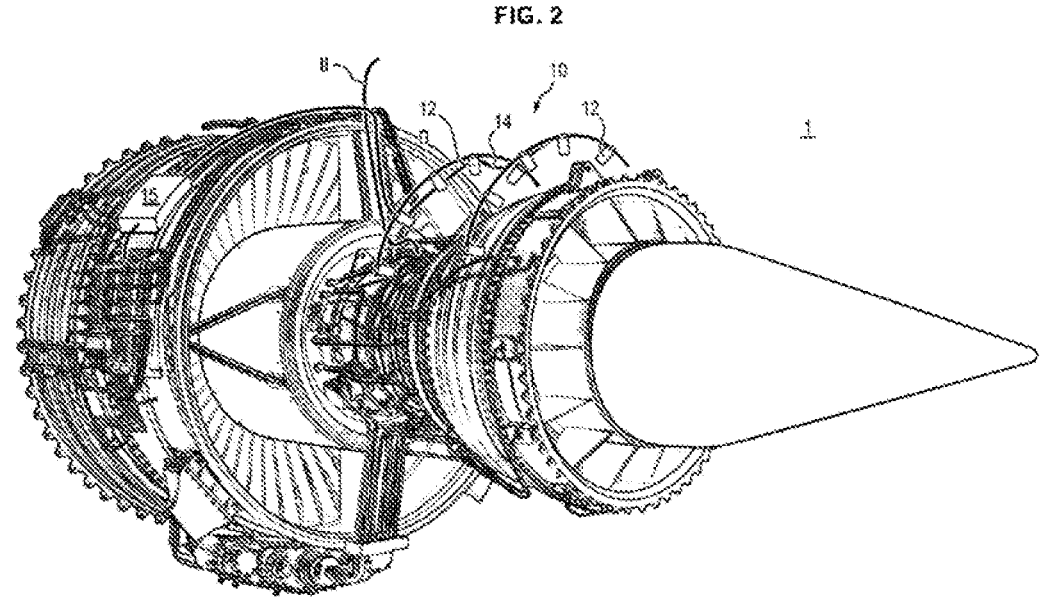
FIG. 2 is a simplified perspective representation of the circulation of dihydrogen in an aircraft turbine engine.

As shown schematically in FIG. 2, the spark plugs 12 can be positioned circumferentially in the retention zone V. This arrangement makes it possible to guarantee optimum combustion of the hydrogen present in the retention zone V.

More precisely, the positioning of the spark plugs 12 can be achieved by first identifying the hydrogen retention regions, as a function of the dihydrogen feed circuit, the geometry of the turbine engine 1, and the architecture of the ventilation circuit. Typically, a retention zone V can be formed in a concave region of the turbine engine 1 close to the dihydrogen feed circuit. Then, in these regions, a retention zone V is determined in which the dihydrogen can be burned without risk. For each retention zone thus determined, the speed and volume of dihydrogen accumulation can be determined. This arrangement potentially enables certain retention zones in which dihydrogen would only accumulate very slightly to be excluded. Moreover, this arrangement also enables the number of spark plugs 12 necessary in a retention zone to be sized. The spark plugs 12 can then be installed in the retention zone V. In the example presented here, a wall VI divides the retention zone V into two distinct volumes. This specific architecture requires the presence of a double row of spark plugs 12. In other words, this specific architecture creates two retention sub-zones and requires spark plugs 12 to be positioned in each of these retention sub-zones.

The spark plugs 12 can be known spark plugs, such as combustion engine spark plugs. The spark plugs 12 are suitable for generating microsparks, continuously or at a defined frequency. Preferably, the spark plugs 12 can generate microsparks at a frequency which can be, for example, between 1.5 and 2 Hz in the case of continuous operation, or at a frequency between 3 and 4 Hz for a limited duration (typically 10 seconds).

Typically, each spark plug 12 comprises electrodes. The electrodes are electrical conductors indirectly connected to an electrical power source. The application of a high voltage to the terminals of the electrodes enables the generation of a microspark.

The microspark which enables the combustion of the dihydrogen corresponds to the forming of an electric arc, in other words a conduction path composed of ionised molecules.

Advantageously, the frequencies of the assembly of spark plugs 12 can be synchronised in order to always have at least one spark plug emitting a microspark. This particular synchronisation very advantageously makes it possible to always have a spark burning the dihydrogen, while avoiding a massive ignition of several spark plugs at the same time, which could cause an explosion. In other words, the synchronisation of the spark plugs is controlled so that there is always at least one spark plug emitting a microspark, making it possible for the dihydrogen to be continuously burned and to quantify the quantity of dihydrogen burned as a function of the number of spark plugs 12 ignited simultaneously. In addition, advantageously, the frequency of each spark plug 12 can also be controlled as a function of the location of the spark plug 12. Thus, a spark plug 12 positioned in a zone in which dihydrogen accumulates rapidly, will be able to have a higher ignition frequency than a spark plug 12 present in a zone in which dihydrogen accumulates more slowly.

In addition, the control assembly 10 can comprise control means 15 of the spark plugs 12. The control means 15 can ignite and modulate a power and the frequency of each spark plug 12. In other words, the control means 15 can control the generation of a microspark and its intensity (i.e. the power emitted by the spark plug 12 to generate the microspark). As will be described below, the control of the power of the spark plug 12 enables the intensity of the combustion of dihydrogen to be adjusted. Schematically, the more power is supplied to the spark plug 12, the more intense the microspark generated and thus the more intense will be the combustion. The term "intense combustion" is understood to mean a large quantity of dihydrogen will be burned with a single microspark. In other words, the more intense the microspark, the more dihydrogen is burned by the chemical combustion reaction caused by this microspark. Typically, the spark plugs 12 can supply an energy of between 0.01 mJ and 1 J, and more preferably, the energy delivered is approximately 10 mJ. The control of the power of the spark plug 12 is a particularly advantageous feature of the invention. More specifically, as will be described below, this enables the power to be adjusted in order to burn an optimum quantity of dihydrogen without the risk of triggering an explosion.

Typically, the control means 15 can comprise a microcontroller suitable for receiving data and controlling the spark plugs 12 as a function of the data received.

Moreover, the control assembly 1 can comprise a dihydrogen detector 16 for detecting an accumulation of dihydrogen in the retention zone V. It is specified that the term "measurement of an accumulation of dihydrogen", shall mean measurement of the presence of dihydrogen (binary measurement of presence or absence) or measurement of a concentration of dihydrogen. According to a particular arrangement, the or each dihydrogen detector 16 is installed in a zone in which dihydrogen can be present (typically, the retention zone V) and in which spark plugs 12 are installed. Thus, the installation zone of the or each sensor can be the zones in which an accumulation of dihydrogen can occur, or can be on the path of a hydrogen leak (between the pipes and the pockets or ventilation outlets). In addition, each detector is installed at a determined distance from a spark plug 12, so as not to be damaged during the emission of the spark (distance depending on the detector supplier).

According to an advantageous arrangement, the dihydrogen detector 16 can control the control means 15 in order to trigger one or more spark plug(s) 12 and modulate the power and frequency as a function of a detected accumulation of dihydrogen. As will be described below, the detector can be used to control the spark plugs 12 in a binary manner, by igniting the spark plugs 12 once dihydrogen is detected and by extinguishing them in the absence of dihydrogen. According to another embodiment which will also be developed below, the detector can enable the frequency of ignition of the spark plugs 12 to be controlled as a function of a measured concentration of dihydrogen.

In addition, the control assembly 1 can comprise detectors of the state (open or closed) of dihydrogen feed valves of the turbine engine 1. As will be described below, this arrangement makes it possible to determine whether the turbine engine 1 is in operation or not, and to adapt the ignition of the spark plugs as a consequence.

Operation and Control of the Hydrogen Control Assembly

In operation, the control means 15 receive information on the state of the dihydrogen feed valves. Knowledge of the state of the feed valves (open or closed) enables the operating state of the turbine engine 1 to be determined. Thus, schematically, if the feed valves are open, the turbine engine 1 is in operation and if the feed valves are closed the turbine engine 1 is stopped.

The determination of the operating state of the turbine engine 1 enables the control means 15 to adjust the controlling of the spark plugs 12. More specifically, even when the turbine engine 1 is stopped, it can be advantageous to trigger the spark plugs 12 in order, for example, to burn the residual dihydrogen which could remain in the retention zone V.

If the dihydrogen control assembly 10 includes dihydrogen detectors 19, these can measure the presence of hydrogen or a concentration of dihydrogen in the retention zone V. In the case of a dihydrogen concentration measurement, this can be compared with a threshold value above which the control means 15 trigger the spark plugs 12. As previously indicated, the spark plugs 12 can be triggered for a dihydrogen concentration of approximately 2%.

More precisely, the spark plugs preferably maintain a dihydrogen concentration less than or equal to 2% in each retention zone. If the dihydrogen concentration reaches 8%, then, the gas having this concentration is in a deflagration range. Also, as a safety measure, the spark plugs 12 cease to operate if the dihydrogen concentration reaches 8% (in this case an alarm will be triggered).

Moreover, the measurement of a dihydrogen concentration can also be used during the generation of microsparks by the spark plugs 12, in order to adjust the frequency and power of the microsparks.

Thus, the higher the concentration of dihydrogen, the more the microspark generation frequency can be increased.

Conversely, the more the dihydrogen concentration decreases, the more the microspark generation frequency can be decreased.

It is specified that controlling the frequency and power of the microsparks as a function of the dihydrogen concentration can be used to maximise the power and frequency, while keeping these parameters below risk values beyond which an explosion could be triggered. In other words, controlling the frequency and the power of the microsparks as a function of the dihydrogen concentration can make it possible to always have an optimum combustion of the dihydrogen present in the retention zone V, without this combustion being able to become dangerous (in other words by keeping a dihydrogen content less than or equal to 8%).

The control of the frequency and power of the spark plugs 12 enables these two parameters to be used separately as a function of the state of the turbine engine and the dihydrogen concentration.

As a function of these various input data (state of the feed valves and hydrogen concentration), the control means control the switching on, power and frequency of the spark plugs.

This control is a particularly advantageous technical feature of the invention, which enables the power and frequency of the spark plugs to be better controlled as a function of the state of the turbine engine 1 and the dihydrogen concentration.

Figure 3:
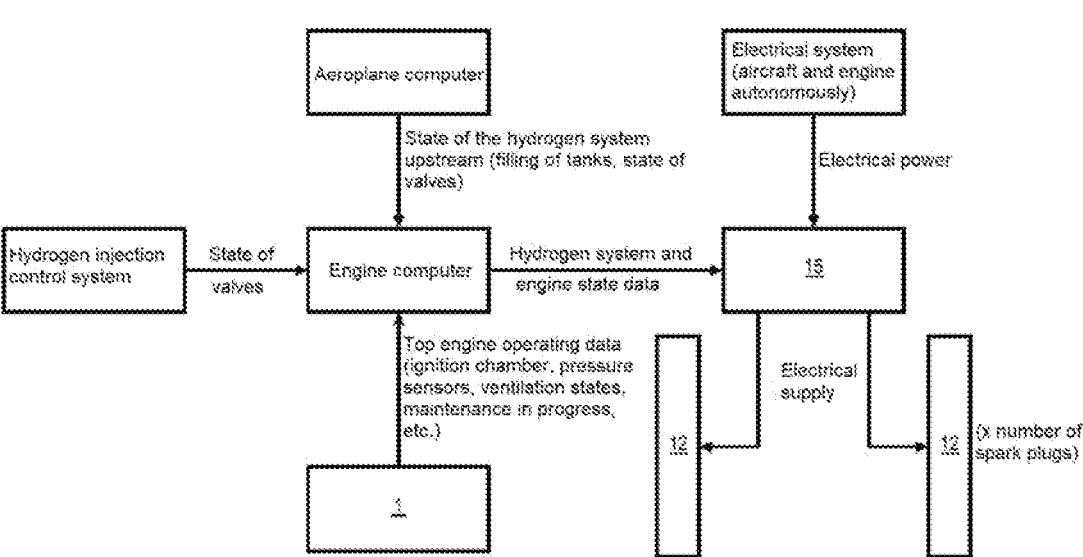
FIG. 3 is a flow diagram of an example of a possible operating mode of a control assembly according to the invention.

The control of the spark plugs is shown schematically in FIG. 3, which presents an exemplary embodiment of control of the spark plugs 12.

In addition, according to particularly advantageous additional features, the control of the spark plugs 12 can be accompanied by an alarm system enabling an alarm to be emitted in the cockpit of the aircraft as a function of a dihydrogen concentration. According to an additional arrangement, the control of spark plugs 12 can be supplemented by an inerting system comprising, for example, inerting nozzles. This inerting system can, for example, be triggered on the basis of a threshold concentration. Typically, the control can operate using a plurality of different thresholds: a threshold for triggering the spark plugs, a threshold for stopping the spark plugs, triggering an alarm and triggering an inerting system.

Turbomachine

Aircraft

According to another aspect, the invention relates to an aircraft comprising at least one turbine engine 1.

The invention claimed is:

1. An aircraft turbine engine,
the aircraft turbine engine comprising
a bypass duct,
feed circuits configured to provide dihydrogen in the combustion chamber,
a dihydrogen control assembly having at least one retention zone,
the at least one retention zone being configured to receive and accumulate dihydrogen leaking out of the feed circuits, the at least one retention zone being located between the bypass duct and an axis of the aircraft turbine engine, the at least one retention zone being located out of the feed circuits,
the dihydrogen control assembly comprising at least one spark plug arranged in the retention zone,
the at least one spark plug being configured to burn in the retention zone at least some of the dihydrogen that accumulates in the retention zone.

2. The aircraft turbine engine according to claim 1, wherein the at least one spark plug is configured to generate microsparks at a defined frequency.

3. The aircraft turbine engine according to claim 2, comprising a plurality of spark plugs,
each spark plug being configured to generate microsparks at a defined frequency,
the frequencies of the plurality of spark plugs being synchronised.

4. The aircraft turbine engine according to claim 3, wherein the frequencies of the plurality of spark plugs are synchronised so that there is always at least one of the spark plugs emitting a microspark.

5. The aircraft turbine engine according to claim 2, comprising control means of the at least one spark plug, the control means being configured to modulate a power and the frequency of the at least one spark plug, and being configured to trigger, or not, the at least one spark plug.

6. The aircraft turbine engine according to claim 1, comprising at least one dihydrogen detector configured to detect an accumulation of dihydrogen in the retention zone.

7. The aircraft turbine engine according to claim 5, comprising at least one dihydrogen detector configured to detect an accumulation of dihydrogen in the retention zone, wherein the at least one dihydrogen detector is configured to control the control means in order to trigger the at least one spark plug and modulate the power and frequency of the at least one spark plug, as a function of a detected accumulation of dihydrogen.

8. The aircraft turbine engine according to claim 6, comprising a detector configured for detecting that dihydrogen feed valves are in an open state or in a closed state.

9. An aircraft comprising at least one turbine engine according to claim 1.

10. The aircraft turbine engine according to claim 1, wherein the at least one spark plug is configured to generate microsparks continuously.

* * * * *